United States Patent
Lee et al.

(10) Patent No.: US 11,105,253 B2
(45) Date of Patent: Aug. 31, 2021

(54) COOLANT HEATING APPARATUS FOR ELECTRIC VEHICLE

(71) Applicants: HYUNDAI MOTOR COMPANY, Seoul (KR); KIA MOTORS CORPORATION, Seoul (KR); DOOWON CLIMATE CONTROL CO., LTD., Asan-si (KR)

(72) Inventors: Sang Shin Lee, Suwon-si (KR); So La Chung, Seoul (KR); Jae Woong Kim, Hwaseong-si (KR); So Yoon Park, Suwon-si (KR); Man Ju Oh, Yongin-si (KR); Jae Woo Park, Ansan-si (KR); Won Suk Lee, Cheonan-si (KR)

(73) Assignees: Hyundai Motor Company, Seoul (KR); Kia Motors Corporation, Seoul (KR); Doowon Climate Control Co., Ltd., Asan-si (KR)

(*) Notice: Subject to any disclaimer, the term of this patent is extended or adjusted under 35 U.S.C. 154(b) by 694 days.

(21) Appl. No.: 15/825,230

(22) Filed: Nov. 29, 2017

(65) Prior Publication Data

US 2019/0048781 A1 Feb. 14, 2019

(30) Foreign Application Priority Data

Aug. 9, 2017 (KR) .................. 10-2017-0100839

(51) Int. Cl.
*F01P 7/14* (2006.01)
*H05B 3/42* (2006.01)
(Continued)

(52) U.S. Cl.
CPC .............. *F01P 7/14* (2013.01); *B60H 1/2221* (2013.01); *F24H 1/145* (2013.01); *F24H 9/0005* (2013.01);
(Continued)

(58) Field of Classification Search
CPC ........ F01P 2007/143; F01P 7/14; F28F 13/06; F28F 2250/10; F28F 2250/102;
(Continued)

(56) References Cited

U.S. PATENT DOCUMENTS 4,694,894 A * 9/1987 Kito ........................ F28F 13/06
122/142
8,620,502 B2 12/2013 Allen
(Continued)

*Primary Examiner* — Dana Ross
*Assistant Examiner* — Joe E Mills, Jr.
(74) *Attorney, Agent, or Firm* — Morgan, Lewis & Bockius LLP

(57) ABSTRACT

A coolant heating apparatus for an electric vehicle includes a sheath heater formed in a coil form at a center side of the coolant heating apparatus; one or more inner tubes, one of which has an inlet formed at one side thereof for introduction of coolant, the one or more inner tubes being arranged to surround the sheath heater or to be surrounded by the sheath heater, and the one or more inner tubes having a plurality of through-holes formed on respective outer peripheral surfaces thereof so that the coolant introduced into the inlet is discharged through the through-holes; and an outer tube surrounding the sheath heater and the one or more inner tubes and having an outlet formed at one side thereof so that the coolant heated by the sheath heater is introduced through the through-holes of the one or more inner tubes and is discharged through the outlet.

8 Claims, 4 Drawing Sheets

(51) Int. Cl.
    *F24H 1/14*     (2006.01)
    *F24H 9/00*     (2006.01)
    *B60H 1/22*     (2006.01)
    *F28F 13/06*     (2006.01)
    *F28D 21/00*     (2006.01)
    *F28D 7/12*     (2006.01)

(52) U.S. Cl.
    CPC ....... *H05B 3/42* (2013.01); *B60H 2001/2271* (2013.01); *F01P 2007/143* (2013.01); *F28D 7/12* (2013.01); *F28D 2021/008* (2013.01); *F28F 13/06* (2013.01); *F28F 2250/10* (2013.01); *F28F 2250/102* (2013.01); *H05B 2203/014* (2013.01)

(58) Field of Classification Search
    CPC .......... B60H 1/2221; B60H 2001/2271; B60H 1/00321; B60H 1/00392; B60L 58/27; F24H 1/103; F24H 1/145; F24H 1/165; F24H 2250/02; F24H 9/0005; F24H 9/0015; F24H 9/1818; F24H 9/2028; F28D 2021/008; F28D 7/12; H05B 2203/014; H05B 3/42
    USPC ........................................................ 392/486
    See application file for complete search history.

(56) References Cited

U.S. PATENT DOCUMENTS

| | | | |
|---|---|---|---|
| 9,167,629 B2 | 10/2015 | Obst et al. | |
| 2011/0042371 A1* | 2/2011 | Nakamura | C22B 19/30 219/647 |
| 2012/0315024 A1* | 12/2012 | Obst | F24H 1/121 392/465 |
| 2014/0374408 A1* | 12/2014 | Seewald | H05B 6/108 219/629 |

* cited by examiner

[FIG. 1]
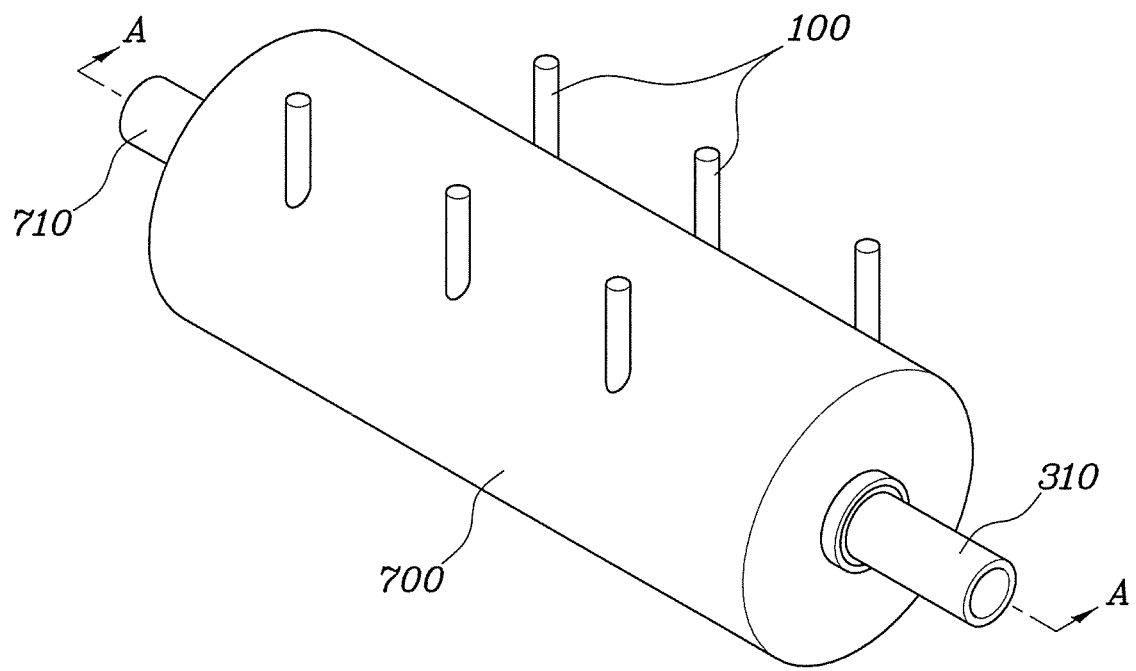

[FIG. 2]
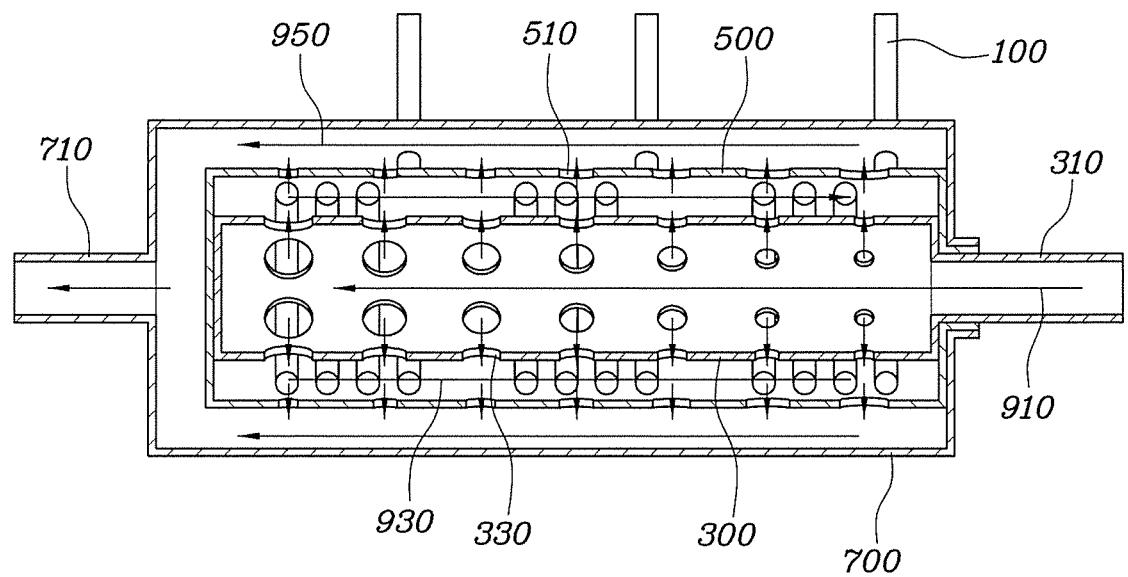
[FIG. 3]
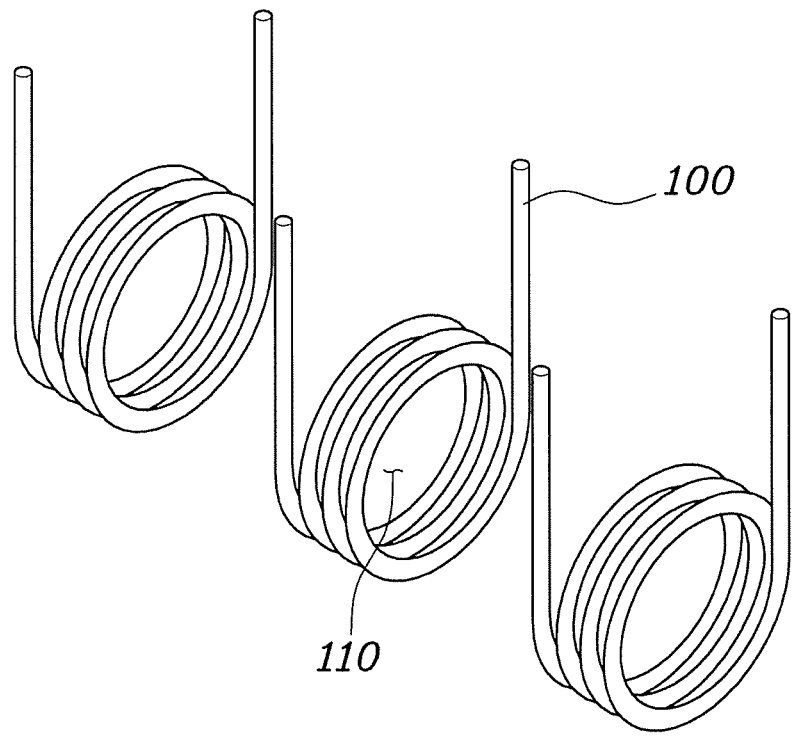

[FIG. 4]
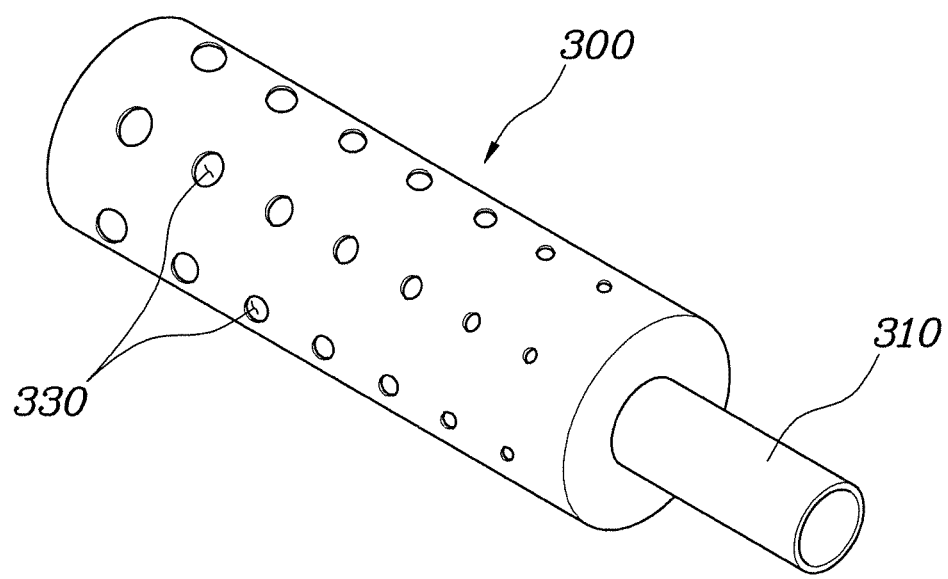
[FIG. 5]
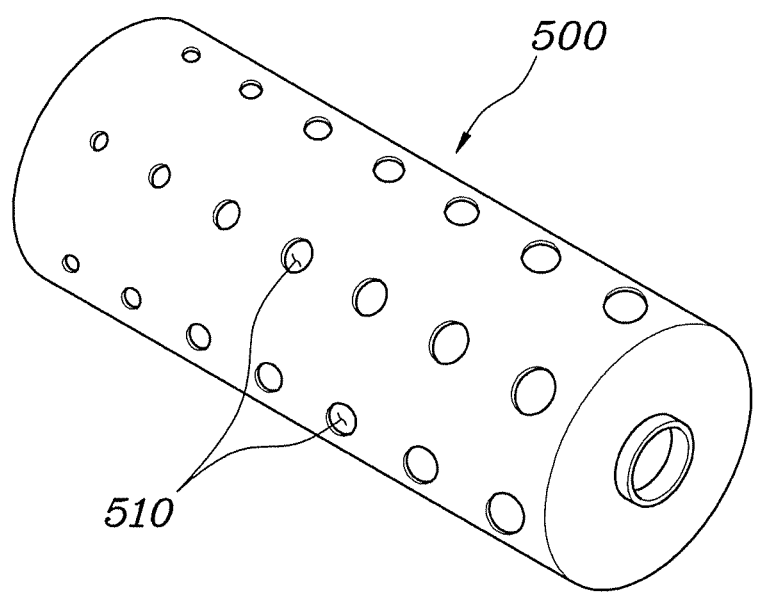

[FIG. 6]
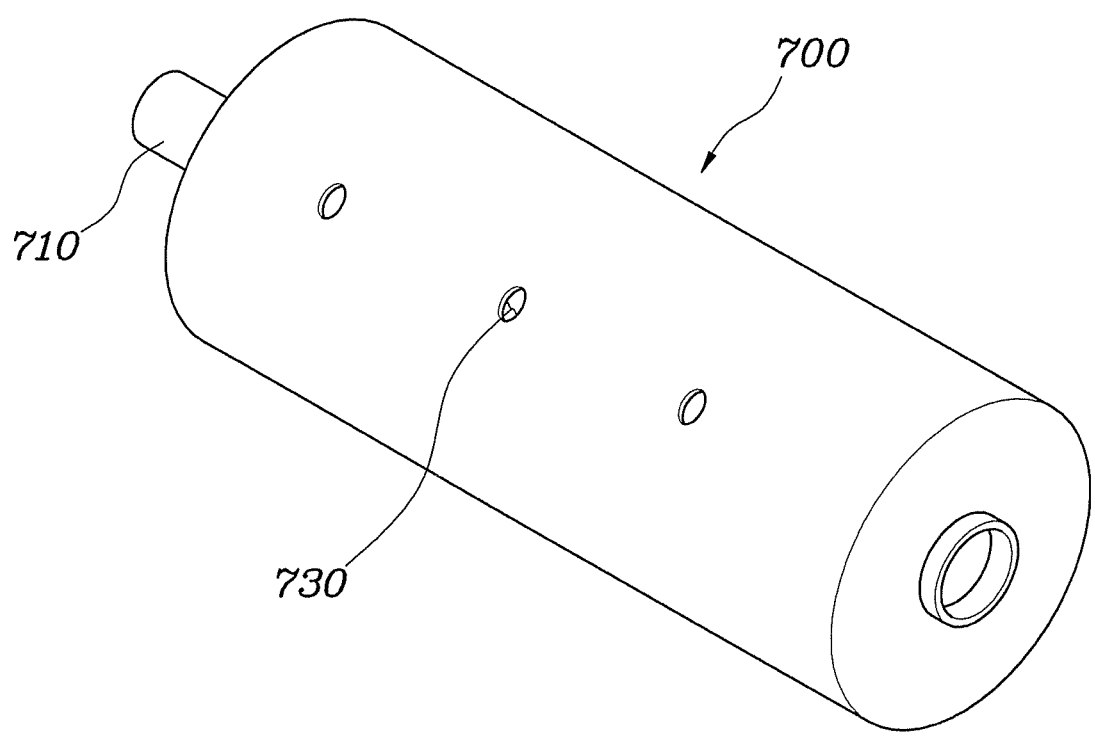

COOLANT HEATING APPARATUS FOR ELECTRIC VEHICLE

CROSS REFERENCE TO RELATED APPLICATION

The present application is based on and claims the benefit of priority to Korean Patent Application No. 10-2017-0100839 filed on Aug. 9, 2017 with the Korean Intellectual Property Office, the entire contents of which are incorporated herein for all purposes by this reference.

TECHNICAL FIELD

The present disclosure relates to heating coolant for an electric vehicle, and, more particularly, to a coolant heating apparatus for an electric vehicle, having high heating efficiency and excellent safety.

BACKGROUND

In recent years, an electric vehicle has been emerged as social issues to realize eco-friendly technology and resolve problems relating to energy exhaustion. This electric vehicle is driven by a motor that outputs power with electricity supplied from a battery. Accordingly, the electric vehicle takes center stage as an eco-friendly vehicle since it does not emit carbon dioxide and makes very small noise, and the motor has higher energy efficiency than an engine.

However, the electric vehicle does not have an engine that is separately installed therein, unlike a conventional internal combustion engine vehicle that heats coolant with heat generated by the engine. Hence, the electric vehicle is disadvantageous in that the coolant may not be heated by the heat generated by the engine.

Thus, the electric vehicle should have a separate device for heating coolant, but such a conventional electric vehicle may not perform effective heat exchange since a housing guides coolant to flow in one direction and the coolant stays in a heating device for a short time due to the smooth flow of the coolant in a passage.

In the conventional electric vehicle, since sheath heaters are located in the flow direction of coolant, a large load is applied to a sheath heater located at an inlet, and a relatively small load is applied to a sheath heater located at an outlet. Hence, the electric vehicle may be ineffective so that parts thereof have low durability, and may not be safe due to overheating caused by unevenly heating coolant.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and the present disclosure is intended to propose a coolant heating apparatus for an electric vehicle, capable of increasing durability of parts and securing safety while evenly heating coolant by increasing a time for which the coolant stays in the heating apparatus.

In accordance with an aspect of the present disclosure, a coolant heating apparatus for an electric vehicle includes a sheath heater formed in a coil form at a center side of the coolant heating apparatus, one or more inner tubes, one of which has an inlet formed at one side thereof for introduction of coolant, the one or more inner tubes being arranged to surround the sheath heater or to be surrounded by the sheath heater, and the one or more inner tubes having a plurality of through-holes formed on respective outer peripheral surfaces thereof so that the coolant introduced into the inlet is discharged through the through-holes, and an outer tube surrounding the sheath heater and the inner tubes and having an outlet formed at one side thereof so that the coolant heated by the sheath heater is introduced through the through-holes of the inner tubes and is then discharged through the outlet.

The one or more inner tubes may include a first passage tube inserted into the sheath heater, and having an inlet formed at one side thereof and a plurality of first through-holes formed on an outer peripheral surface thereof for discharge of the coolant, and a second passage tube surrounding the sheath heater and having a plurality of second through-holes formed on an outer peripheral surface thereof for discharge of the coolant, introduced through the first through-holes, to the outer tube.

The inlet may be formed at one side of the first passage tube, and the outlet may be formed at another side of the outer tube, the inlet and the outlet disposed in opposite sides.

The plurality of first through-holes may be spaced apart from each other in a longitudinal direction of the first passage tube, and have diameters increased from the inlet to an opposite side thereof.

Alternatively, the plurality of first through-holes may be spaced apart from each other in a flow direction of the coolant, and have diameters increased downstream in the flow direction of the coolant.

The plurality of second through-holes may be spaced apart from each other in a longitudinal direction of the second passage tube, and have diameters increased from an opposite side of the inlet of the first passage tube to the inlet.

Alternatively, the plurality of second through-holes may be spaced apart from each other in a flow direction of the coolant, and have diameters increased downstream in the flow direction of the coolant.

The plurality of first through-holes may be spaced apart from each other in a longitudinal direction of the first passage tube and have diameters increased from the inlet to an opposite side thereof, such that a first flow is formed in which the coolant introduced into the inlet flows from the inlet to the opposite side thereof, the plurality of second through-holes may be spaced apart from each other in a longitudinal direction of the second passage tube and have diameters increased from the opposite side of the inlet to the inlet, such that a second flow is formed in which the coolant introduced into the second passage tube through the first through-holes flows in a direction opposite to the first flow, and a third flow may be formed in which the coolant introduced to the outer tube through the second through-holes is discharged through the outlet.

Relatively low-temperature coolant introduced through the first through-holes of the first passage tube, which are located an upstream point of the first flow, may be mixed at a downstream point of the second flow, thereby preventing overheating of the coolant.

Relatively low-temperature coolant introduced through the second through-holes of the second passage tube, which are located an upstream point of the second flow, may be mixed at a downstream point of the third flow, thereby preventing overheating of the coolant.

As apparent from the above description, the coolant heating apparatus for an electric vehicle having the abovementioned structure is advantageous in that it is possible to increase the time for heat transfer with the sheath heater by the resistance generated in the flow of coolant by a plurality of through-holes formed in each passage tube and to uniformize an increased temperature load for each sheath heater by controlling the flow pattern of coolant. In addition, the coolant heating apparatus can have excellent safety by prevention of overheating and high performance by an increase in efficiency of the sheath heater since a uniform load is provided to the sheath heater by formation of a coolant mixing section in which coolant having a relatively low temperature is introduced and mixed between housings.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a view illustrating a coolant heating apparatus for an electric vehicle according to an embodiment of the present disclosure;

FIG. 2 is a cross-sectional view taken along line A-A of FIG. 1;

FIG. 3 is a view illustrating a plurality of sheath heaters of FIG. 1;

FIG. 4 is a view illustrating a first passage tube of FIG. 1;

FIG. 5 is a view illustrating a second passage tube of FIG. 1; and

FIG. 6 is a view illustrating an outer tube of FIG. 1.

DETAILED DESCRIPTION

A coolant heating apparatus for an electric vehicle according to the preferred embodiments of the present disclosure will be described below with reference to the accompanying drawings.

FIG. 1 is a view illustrating a coolant heating apparatus for an electric vehicle according to an embodiment of the present disclosure. FIG. 2 is a cross-sectional view taken along line A-A of FIG. 1. FIG. 3 is a view illustrating a plurality of sheath heaters 100 of FIG. 1. FIG. 4 is a view illustrating a first passage tube 300 of FIG. 1. FIG. 5 is a view illustrating a second passage tube 500 of FIG. 1. FIG. 6 is a view illustrating an outer tube 700 of FIG. 1.

As illustrated in FIGS. 1 and 2, the coolant heating apparatus for an electric vehicle according to the embodiment of the present disclosure includes a sheath heater 100 that is formed in a coil form at the center side thereof, one or more inner tubes 300 and 500, one of which has an inlet 310 formed at one side thereof for introduction of coolant.

The inner tubes 300 and 500 are arranged to surround the sheath heater 100 or to be surrounded by the sheath heater 100, and have a plurality of through-holes 330 and 510 formed on the respective outer peripheral surfaces thereof so that the coolant introduced into the inlet 310 is discharged through the through-holes 330 and 510, and an outer tube 700 that surrounds the sheath heater 100 and the inner tubes 300 and 500 and has an outlet 710 formed at one side thereof so that the coolant heated by the sheath heater 100 is introduced through the through-holes 330 and 510 of the inner tubes 300 and 500 and is then discharged through the outlet 710.

In particular, the inner tubes 300 and 500 may include a first passage tube 300 that is inserted into the sheath heater 100 and that has an inlet 310 formed at one side thereof and a plurality of first through-holes 330 formed on the outer peripheral surface thereof for discharge of coolant, and a second passage tube 500 that surrounds the sheath heater 100 and that has a plurality of second through-holes 510 formed on the outer peripheral surface thereof for discharge of the coolant, introduced through the first through-holes 330, to the outer tube 700. Although the inner tubes 300 and 500 are illustrated and described to be first and second passage tubes 300 and 500 in the embodiment of the present disclosure, the present disclosure is not especially limited thereto. For example, the number of inner tubes may be changed depending on the environment or the design.

As illustrated in FIG. 3, the sheath heater 100 is formed of a wire, and is particularly formed in a coil form to have an insertion space 110 therein. The sheath heater 100 may consist of a plurality of sheath heaters spaced apart from each other for more efficient heating of coolant.

As illustrated in FIG. 4, the first passage tube 300 has a pipe shape, the inlet 310 is formed at one side of the first passage tube 300 for introduction of coolant into the first passage tube 300, and the other side of the first passage tube 300 is closed. The first through-holes 330 are formed on the outer peripheral surface of the first passage tube 300. The first passage tube 300 is inserted into the insertion space 110 of the sheath heater 100. The first through-holes 330 are spaced apart from each other in the longitudinal direction of the first passage tulle 300, and have diameters increased from the inlet side to the opposite side thereof. Alternatively, the first through-holes 330 are spaced apart from each other in the flow direction of coolant, and have diameters increased downstream in the flow direction of coolant.

By formation of the first through-holes 330 as described above, the coolant introduced through the inlet 310 is discharged to the second passage tube 500 through the first through-holes 330 of the first passage tube 300 while the coolant flows from one side of the first passage tube 300 to the other side thereof by a pressure difference in the first passage tube 300, with the consequence that a first flow 910 is formed.

As illustrated in FIG. 5, the second passage tube 500 has a pipe shape, has a hole formed at one side thereof for insertion of the inlet 310 of the first passage tube 300, and the other side of the second passage tube 500 is closed. The second through-holes 510 are formed on the outer peripheral surface of the second passage tube 500. The second passage tube 500 is formed to surround the first passage tube 300 and the sheath heater 100. Thus, the coolant discharged through the first through-holes 330 of the first passage tube 300 is introduced into the second passage tube 500. The second through-holes 510 are spaced apart from each other in the longitudinal direction of the second passage tube 500, and have diameters increased from the opposite side of the inlet 310 of the first passage tube 300 to the inlet side. Alternatively, the second through-holes 510 are spaced apart from each other in the flow direction of coolant, and have diameters increased downstream in the flow direction of coolant.

By formation of the second through-holes 510 as described above, the coolant introduced through the first through-holes 330 of the first passage tube 300 is discharged to the outer tube 700 through the second through-holes 510 of the second passage tube 500 while the coolant flows from the other side of the second passage tube 500 to one side thereof by a pressure difference in the second passage tube 500, with the consequence that a second flow 930 is formed. In particular, the inlet 310 is formed at one side of the first passage tube 300, and the outlet 710 is formed at the other side of the outer tube 700, so that the inlet 310 and the outlet 710 are disposed in opposite directions.

As illustrated in FIG. 6, the outer tube 700 is spaced apart from the second passage tube 500, and is formed to surround the second passage tube 500. The outer tube 700 has a through-hole 730 formed for exposure of end portions of the coil form of the sheath heater 100. The outer tube 700 has a hole formed at one side thereof for insertion of the inlet 310, and the outlet 710 is formed at the other side of the outer tube 700 for discharge of the coolant introduced through the second through-holes 510 of the second passage tube 500. Thus, a third flow 950, in which the coolant introduced through the second through-holes 510 of the second passage tube 500 flows from one side of the outer tube 700 to the other side thereof, is formed such that the coolant is discharged through the outlet 710.

The flow of coolant will be described in detail with reference to FIG. 2. First, the coolant heating apparatus for an electric vehicle according to the embodiment of the present disclosure is configured such that the first passage tube 300 is inserted into the sheath heater 100, the sheath heater 100 and the first passage tube 300 are inserted into the second passage tube 500, the second passage tube 500 is inserted into the outer tube 700, and both ends of the sheath heater 100 are exposed to the outside through the second passage tube 500 and the outer tube 700 for electric connection.

Therefore, when coolant having a relatively low temperature is introduced into the inlet 310 of the first passage tube 300 during heating of the coolant, a flow resistance is generated by having relatively small diameters of the first through-holes 330 at the inlet side, so that the first flow 910 is formed while the coolant flows from one side of the first passage tube 300 to the other side thereof and that a portion of the coolant is discharged through the first through-holes 330. In this case, the coolant is heated by the sheath heater 100.

The second flow 930 is formed while the coolant discharged to the second passage tube 500 through the first through-holes 330 flows from one side of the second passage tube 500 to the other side thereof (e.g., opposite direction to the first flow 910) by a flow resistance generated by having relatively small diameters of the second through-holes 510 at the outlet side, and that a portion of the coolant is discharged through the second through-holes. In this case, the coolant is heated by the sheath heater 100.

In addition, the third flow 950 is formed while the coolant discharged to the outer tube 700 through the second through-holes 510 flows along the outer tube 700, and the heated coolant is finally discharged to the outlet 710.

In this case, the coolant discharged through the first through-holes 330, which are located upstream of the first flow 910, is mixed at the downstream point of the second flow 930 formed in the second passage tube 500. Since the coolant discharged through the first through-holes 330 in the first flow 910 has a relatively low temperature compared to the coolant in the second flow 930, it is possible to prevent overheating of the coolant. Similarly, the coolant discharged through the second through-holes 510, which are located upstream of the second flow 930, is mixed at the downstream point of the third flow 950 formed in the outer tube 700. Since the coolant discharged through the second through-holes 510 in the second flow 930 has a relatively low temperature compared to the coolant in the third flow 950, it is possible to prevent overheating of the coolant.

In accordance with the coolant heating apparatus for an electric vehicle according to the embodiment of the present disclosure, it is possible to increase the time for heat transfer with the sheath heater 100 by the resistance generated in the flow of coolant by the plurality of through-holes formed in each passage tube, and to uniformize an increased temperature load for each sheath heater 100 by controlling the flow pattern of coolant. In addition, the coolant heating apparatus can have excellent safety by prevention of overheating and high performance by an increase in efficiency of the sheath heater 100 since a uniform load is provided to the sheath heater 100 by formation of a coolant mixing section in which coolant having a relatively low temperature is introduced and mixed between the housings.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A coolant heating apparatus for an electric vehicle, comprising:
   a sheath heater formed in a coil form at a center side of the coolant heating apparatus;
   one or more inner tubes, one of which has an inlet formed at one side thereof for introduction of coolant, the one or more inner tubes being arranged to surround the sheath heater or to be surrounded by the sheath heater, and the one or more inner tubes having a plurality of through-holes formed on respective outer peripheral surfaces thereof so that the coolant introduced into the inlet is discharged through the through-holes; and
   an outer tube surrounding the sheath heater and the one or more inner tubes and having an outlet formed at one side thereof so that the coolant heated by the sheath heater is introduced through the through-holes of the one or more inner tubes and is then discharged through the outlet,
   wherein:
   the one or more inner tubes comprise:
     a first passage tube inserted into the sheath heater, and having an inlet formed at one side thereof and a plurality of first through-holes formed on an outer peripheral surface thereof for discharge of the coolant; and
     a second passage tube surrounding the sheath heater and having a plurality of second through-holes formed on an outer peripheral surface thereof for discharge of the coolant, introduced through the first through-holes, to the outer tube,
   the plurality of first through-holes are spaced apart from each other in a longitudinal direction of the first passage tube and have diameters increased from the inlet to an opposite side thereof,
   the plurality of second through-holes are spaced apart from each other in a longitudinal direction of the second passage tube and have diameters increased from the opposite side of the inlet to the inlet,
   the sheath heater includes a plurality of sheath heaters spaced apart from one another,
   a plurality of outer penetration holes are formed on an outer peripheral surface of the outer tube, and
   respective end portions of the plurality of sheath heaters penetrate through the plurality of outer penetration holes to be exposed outside of the outer tube.

2. The coolant heating apparatus according to claim 1, wherein the inlet is formed at one side of the first passage tube, and the outlet is formed at another side of the outer tube, the inlet and the outlet disposed in opposite sides.

3. The coolant heating apparatus according to claim 1, wherein the plurality of first through-holes are spaced apart from each other in a longitudinal direction of the first passage tube, and have diameters increased from the inlet to an opposite side thereof.

4. The coolant heating apparatus according to claim 1, wherein the plurality of first through-holes are spaced apart from each other in a flow direction of the coolant, and have diameters increased downstream in the flow direction of the coolant.

5. The coolant heating apparatus according to claim 1, wherein the plurality of second through-holes are spaced apart from each other in a longitudinal direction of the second passage tube, and have diameters increased from an opposite side of the inlet of the first passage tube to the inlet.

6. The coolant heating apparatus according to claim 1, wherein the plurality of second through-holes are spaced apart from each other in a flow direction of coolant, and have the diameters increased downstream in the flow direction of the coolant.

7. The coolant heating apparatus according to claim 1, wherein the coolant introduced through the first through-holes of the first passage tube, which are located an upstream point of the first flow, is mixed at a downstream point of the second flow, and wherein a temperature of the coolant introduced through the first through-holes of the first passage tube is lower than a temperature of the coolant in the second flow, thereby preventing overheating of the coolant.

8. The coolant heating apparatus according to claim 1, wherein the coolant introduced through the second through-holes of the second passage tube, which are located an upstream point of the second flow, is mixed at a downstream point of the third flow, and wherein a temperature of the coolant introduced through the second through-holes of the second passage tube is lower than a temperature of the coolant in the third flow, thereby preventing overheating of the coolant.

* * * * *